(12) United States Patent
Nord et al.

(10) Patent No.: US 8,944,205 B2
(45) Date of Patent: Feb. 3, 2015

(54) BICYCLE MOTOR HUB

(75) Inventors: Göran Nord, Helsingborg (SE);
Lars-Olov Pennander, Helsingborg (SE)

(73) Assignee: Hoganas AB (Publ), Hoganas (SE)

( * ) Notice: Subject to any disclaimer, the term of this patent is extended or adjusted under 35 U.S.C. 154(b) by 55 days.

(21) Appl. No.: 13/696,724

(22) PCT Filed: May 10, 2011

(86) PCT No.: PCT/EP2011/057468
§ 371 (c)(1),
(2), (4) Date: Nov. 7, 2012

(87) PCT Pub. No.: WO2011/141446
PCT Pub. Date: Nov. 17, 2011

(65) Prior Publication Data
US 2013/0057047 A1    Mar. 7, 2013

Related U.S. Application Data

(60) Provisional application No. 61/333,594, filed on May 11, 2010.

(30) Foreign Application Priority Data

May 11, 2010    (DK) .................................. 2010 70201

(51) Int. Cl.
*B62M 6/65*      (2010.01)
*H02K 21/22*     (2006.01)
*H02K 7/14*      (2006.01)

(52) U.S. Cl.
CPC .............. *B62M 6/65* (2013.01); *H02K 21/227* (2013.01); *H02K 7/14* (2013.01)
USPC ........................................ 180/206.6; 301/6.5

(58) Field of Classification Search
USPC ................... 180/65.51, 206.6, 206.5; 301/6.5
See application file for complete search history.

(56) References Cited

U.S. PATENT DOCUMENTS

| 5,560,442 A | 10/1996 | Canderle |
| 5,920,139 A | 7/1999 | Fujiwara et al. |
| 6,278,216 B1 | 8/2001 | Li |

(Continued)

FOREIGN PATENT DOCUMENTS

| EP | 0 798 842 A1 | 10/1997 |
| EP | 1 239 571 A1 | 9/2002 |

(Continued)

OTHER PUBLICATIONS

International Search Report (PCT/ISA/210) issued on Jun. 20, 2011, by the European Patent Office as the International Searching Authority for International Application No. PCT/EP2011/057468.

(Continued)

*Primary Examiner* — Tony Winner
(74) *Attorney, Agent, or Firm* — Buchanan Ingersoll & Rooney P.C.

(57) ABSTRACT

A hub electric motor unit for a motor-driven or motor-assisted vehicle, the vehicle comprising a frame, a wheel having a hub and a wheel rim connected to the hub by a plurality of spokes; the hub electric motor unit comprising a shaft connectable to the frame of the vehicle, a stator unit mounted on the hub shaft, a rotor disposed around and coaxially with the hub shaft; a hub shell rotatably mounted on the hub shaft, wherein the hub shell comprises two cap members axially disposed on respective sides of the rotor; wherein each cap member comprises a connecting part for connecting a respective subset of the spokes.

13 Claims, 5 Drawing Sheets

(56) References Cited

U.S. PATENT DOCUMENTS

| | | |
|---|---|---|
| 2002/0121826 A1 | 9/2002 | Weiss |
| 2004/0140725 A1 | 7/2004 | Takahashi |
| 2007/0138900 A1 | 6/2007 | Imai et al. |

FOREIGN PATENT DOCUMENTS

| | | | |
|---|---|---|---|
| EP | 1 427 089 A2 | 6/2004 |
| EP | 1 667 310 A1 | 6/2006 |
| WO | WO 99/25057 A1 | 5/1999 |
| WO | WO 2007/024184 A1 | 3/2007 |
| WO | WO 2009/116938 A1 | 9/2009 |

OTHER PUBLICATIONS

Written Opinion (PCT/ISA/237) issued on Jun. 20, 2011, by the European Patent Office as the International Searching Authority for International Application No. PCT/EP2011/057468.

BICYCLE MOTOR HUB

FIELD OF THE INVENTION

This invention generally relates to motor-driven or motor-assisted vehicles having a wheel including a wheel hub and a wheel rim connected to the hub by a number of spokes, and more particular to a hub electric motor for such a motor-driven or motor-assisted vehicle such as a bicycle or tricycle.

BACKGROUND OF THE INVENTION

Motor-driven or motor-assisted bicycles are known wherein batteries are carried and an electric motor is mounted to the bicycle so as to provide a motive force to the bicycle. Normally, the principal motive force for the bicycle is still human pedalling power, and the motor assists this human pedalling power. Various driving devices have been proposed for motor-driven bicycles. Such devices include driving devices in which a DC electric motor is built into one of the hubs of the bicycle as disclosed in U.S. Pat. No. 5,560,442. Such devices are advantageous in that a compact driving mechanism can be constructed.

It is generally desirable to provide components of a hub electric motor unit that can be manufactured at low manufacturing costs and that can efficiently be assembled. It is further generally desirable to provide components of a modulated pole machine that fulfill one or more of the following criteria: high stability, high durability, high resistance against stress, low weight, high performance numbers or values of the hub electric motor unit, such as torque pr. volume and/or torque pr. current.

SUMMARY OF THE INVENTION

Disclosed herein is a hub electric motor unit for a motor-driven or motor-assisted vehicle, the vehicle comprising a frame, a wheel having a hub and a wheel rim connected to the hub by a plurality of spokes; the hub electric motor unit comprising a shaft connectable to the frame of the vehicle, a stator unit mounted on the hub shaft, a rotor disposed around and coaxially with the hub shaft; a hub shell rotatably mounted on the hub shaft, wherein the hub shell comprises two cap members axially disposed on respective sides of the rotor; wherein each cap member comprises a connecting part for connecting a respective subset of the spokes.

Hence, embodiments of the hub electric motor unit described herein comprise end cap members on both sides of the rotor. As the cap members transfer radial mechanical forces between the wheel rim and the hub, a de-coupling of the radial mechanical forces from the magnetic rotor section is provided. Consequently, the impact of the wheel force transfer on the magnetic circuit components of the rotor is significantly reduced.

It is another advantage of embodiments of the hub electric motor disclosed herein that it is easy to manufacture due the small number of components, and because many components have low geometric complexity.

Embodiments of the hub electric motor unit are particularly beneficial when the electric motor is a modulated pole machine (MPM) motor, comprising permanent magnets and pole-piece sections subsequently mounted in series along the circumference of the rotor. Even though the MPM design has been found to have a variety of advantages in the context of motor assisted vehicles, the MPM structure is relatively sensitive to radial mechanical forces. In particular, the radial stiffness of such a design is relatively low compared to designs using surface mounted magnets mounted to a 'core-back' made of e.g. mild steel.

Embodiments of a modulated pole electric machine stator may comprise a central single winding that magnetically feeds multiple teeth formed by a soft magnetic core structure. The soft magnetic core is formed around the winding, e.g. coaxially with the winding and axially sandwiching the winding between two core sections. Examples of the modulated pole machine topology are sometimes recognised as e.g. Claw-pole-, Crow-feet-, Lundell- or TFM-machines. Modulated pole machines with buried magnets further comprise an active rotor structure including a plurality of permanent magnets being separated by rotor pole sections. The active rotor structure is built up from an even number of segments, whereas half the number of segments is made of soft magnetic material and the other half number of segments is made from permanent magnet material. The permanent magnets are arranged so that the magnetization direction of the permanent magnets is substantially circumferential, i.e. the north and south pole, respectively, is pointing in a substantially circumferential direction.

Hence, in some embodiments, the stator unit and the rotor form a modulated pole machine, thus allowing to fulfill high demands on high torque, relatively low speed and low cost. In particular, these demands may be fulfilled by embodiments of the hub electric motor unit described herein that may be manufactured as a motor with a relatively high pole number in a compact geometry using a small volume of permanent magnets and wire coils to fit and to meet cost demands by the enhanced rotor assembly routine.

The stator unit may include a first stator core section having a substantially annular part and including a plurality of teeth, a second stator core section having a substantially annular part and including a plurality of teeth, and a coil arranged between the first and second annular stator core sections.

The teeth of the second stator core section may be axially separated from the teeth of the first stator core section by a circumferentially extending gap. In some embodiments the gap is not interrupted by teeth from the first or second stator core section and forms an unbroken ring. The gap my define a plane ring, an undulating ring or the like.

The first stator core section, the second stator core section, and the coil may be disposed around and coaxial with the hub shaft, and the plurality of teeth of the first stator core section and the second stator core section may be arranged to protrude radially towards the rotor. The teeth of the second stator core section may be circumferentially displaced in relation to the teeth of the first stator core section.

In some embodiments the rotor comprises a plurality of permanent magnets. In some embodiments the permanent magnets in the rotor are separated from each other by pole sections made from soft magnetic material. In particular, the permanent magnets in the rotor may be separated in the circumferential direction from each other by axially extending pole sections. The pole sections may be made of a magnetic powder. The permanent magnets may be magnetised in the circumferential direction and with alternating orientation. Embodiments of the rotor allow the permanent magnet field to flux-concentrate or be flexible in a direction transverse to the motion as e.g. described in the patent application WO2007/024184 by Jack et al.

In some embodiments, also referred to as outer-rotor configuration, the rotor is arranged around the first and second stator core sections and wherein the teeth extend radially outward. In alternative embodiments, also referred to as inner-rotor configuration, the stator is arranged around the rotor and the teeth extend radially inward.

Generally, during operation, embodiments of a modulated pole machine have a three-dimensional (3D) flux path, including a flux path component in the transverse direction relative to the direction of movement. The stator and/or the rotor may comprise such a transverse flux path component, i.e. a flux path component in the axial direction. It is a benefit of the modulation that every pole sees all of the magneto motive force (MMF) of the coil, such that, as the pole number rises, the magnetic field strength (MMF/meter) rises with it without any change in the coil. This may be compared with a conventional machine in which, as the pole number rises, so does the number of coils and hence the smaller each coil is. The pole pitch however also falls with pole number, so that as the pole number rises, the magnetic field strength is more or less constant in a conventional machine as the MMF/coil reduction balances with the reduction in pole pitch.

In some embodiments, the rotor may comprise an outer protective tube, e.g. made of aluminium, plastic, e.g. injection moulded plastics, and/or the like, which protects the motor from humidity, dirt, and other environmental factors. The outer protective tube may form part of the hub shell. For example, the hub shell may comprise the outer protective tube and cap members attached to respective ends of the outer protective tube. It is an advantage that such a protective tube may be made of relatively light-weight material, as no high radial stiffness of the rotor is required. Hence, in embodiments of the hub electric motor unit described herein, the degrees of freedom when choosing materials for the rotor structure is increased, even allowing the choice of materials for the rotor structure that are unsuitable for transferring the mechanical load from the spokes due to low strength and stiffness. In some embodiments, the outer protective tube may form a tubular support structure of the rotor, defining a circumferential mounting surface for mounting magnetically active components of the rotor, i.e. components such as permanent magnets and/or soft magnetic rotor pole pieces that each form at least a part of the magnetic flux path of the rotor. Together the magnetically active components of the rotor form one or more uninterrupted magnetic flux paths of the rotor, each flux path extending from one position along an active air gap to another position along the active air gap, the active air gap communicating magnetic flux during operation of the motor between the rotor and the stator. Such tubular support structure thus may have a dual function: Firstly it forms a protective portion of the hub shell protecting the motor against dirt, water, and/or other environmental factors. Secondly, it provides a mounting surface for magnetically active parts of the rotor which may be mounted directly to the tubular support structure. When all magnetically active parts of the rotor are directly connected to the outer protective tube, a radially compact rotor design is provided. To this end, the tubular support structure may provide mounting and/or alignment means such as tracks, ridges, recesses, protrusions, and/or the like. It is interesting to note that the magnetically active parts may be mounted directly to the tubular support structure and that the rotor structure is not required to include any additional stabilising components for structurally stabilising the rotor, e.g. steel rings etc. which would add to the cost and moment of inertia of the motor. The tubular support structure may be made of a light-weight material such as aluminium or plastics. Furthermore, the tubular support structure may be extruded or manufactured in a similarly simple and cost-effective manner.

In particular, in some embodiments, the rotor comprises:
a tubular support structure, e.g. in the form of an outer protective tube, defining a circumferential mounting surface, the tubular support structure comprising a plurality of elongated recesses in the mounting surface, the elongated recesses extending in an axial direction of the tubular support structure;
a plurality of permanent magnets magnetised in the circumferential direction of said rotor so as to generate the rotor magnetic field, the permanent magnets being separated from each other in the circumferential direction of the rotor by axially extending rotor pole sections for directing the rotor magnetic field generated by said permanent magnets in a radial direction,
wherein at least one permanent magnet or at least one rotor pole section extends radially at least partly into one of the plurality of recesses. Hence at least one component chosen from a permanent magnet and a rotor pole section extends at least partly into one of the plurality of recesses, such that a part of the component extends out of the recess.

Consequently, in embodiments of the rotor, the permanent magnets and rotor pole sections form a tubular rotor structure coaxial with the tubular support structure. One of the circumferential surfaces of the tubular rotor structure is connected to the circumferential mounting surface of the tubular support structure. To this end, some or all of the permanent magnets and/or some or all of the rotor pole sections project radially from said one of the circumferential surfaces of the tubular rotor structure and into respective recesses of the mounting surface of the tubular support structure.

Embodiments of the rotor provide an efficient and reliable assembly process, where a well-defined air-gap is provided even with relatively large tolerances on the individual components, and even when the components to be assembled have limited strength and brittle behaviour.

It is another advantage of the hub electric motor unit described herein that it provides a high degree of failure safeness, as the spokes mounted to the cap members hold the structure together without having to rely on just a few bolt connections. Hence, the motor housing is protected from unintentional separation.

Each cap member may be formed as a single, integral component, e.g. as an end-plate. Each cap member may comprise a disc portion and a plurality of mounting elements, circumferentially disposed around a center of the disc, for mounting respective ones of the spokes. The cap members may have the form of generally disc-shaped end-plates, thus allowing for components with relatively few geometric features, thus reducing the complexity of manufacturing. The cap members are disposed coaxially with the hub shaft, e.g. such that the hub shaft axially protrudes through the centre of the cap members such that the stator and the rotor are sandwiched between the cap members.

The hub electric motor unit is arranged for providing a driving force to the vehicle. To this end, each cap member may comprise one or more mounting members for non-rotatably mounting the rotor to the cap member, so as to allow transfer of torque from the rotor to the cap members. The rotor may be a tubular structure having respective first and second end faces. Each cap member may be mounted to a respective one of the end faces. Accordingly, the rotor, e.g. the end faces of the rotor and/or a tubular support structure, may comprise means for transferring the torque generated by the interaction between the rotor and the stator to the cap members.

In some embodiments of the invention the rotor pole sections are made from a soft magnetic material such as soft magnetic powder, thus allowing a simple manufacturing process of the rotor may, as well as providing magnetic flux concentration, utilizing the advantage of effective three-dimensional flux paths.

In some embodiments of the invention the tubular support structure is made of a non-permeable material such as aluminium, plastic, e.g. extruded aluminium, injection moulded plastics etc. and/or the like, and/or other suitable non-magnetic materials. By producing the tubular support structure of a non-permeable material the magnetic properties of the rotor is undisturbed.

The magnetic powder for manufacturing the rotor pole sections and/or the stator pole sections, and/or other components of the hub electric motor unit may e.g. be a soft magnetic iron powder or an iron alloy powder containing Co, Ni or Si, or an iron or iron alloyed powder mixed with Co, Ni or Si containing powders. The soft magnetic powder could be a substantially pure water atomised iron powder or a sponge iron powder having irregular shaped particles which have been coated with an electrical insulation. In this context "substantially pure" means that the powder should be free from inclusions and that the amount of impurities such as O, C and N should be kept at a minimum, i.e. the content of iron should be above 99% by weight, preferably above 99.5% by weight. The average particle sizes are generally below 300 μm and above 10 μm.

However any soft magnetic metal powder or metal alloy powder may be used as long as the soft magnetic properties are sufficient and that the powder is suitable for die compaction. The stator core sections and/or rotor pole sections may be manufactured from the soft magnetic powder by a suitable compaction process such as uniaxial compaction at compaction pressures between 400 and 1200 MPa. After compaction the obtained components may be stress released in a heat treatment process up to 750° C. in order to minimize the hysteresis losses.

In order to minimize the weight and size of the components not only the properties of the magnetic powder are important, it is also of outmost importance that a suitable insulated coating is provided on the magnetic powder. Examples of powders having insulated particles are available from Höganäs AB, Sweden and examples of such powders are Somaloy®500, Somaloy®500 or Somaloy®700.

The electrical insulation of the powder particles may be made of an inorganic material. Especially suitable are the type of insulation disclosed in U.S. Pat. No. 6,348,256 (which is hereby incorporated by reference), which concerns particles of a base powder consisting of substantially pure iron having an insulating oxygen- and phosphorous containing barrier. The oxygen content of such powder being at most 0.2% by weight higher than the oxygen content of the of the base powder, the ratio O:P being between 15 and 2 as measured by the ESCA method and the barrier having a thickness of at most 100 nm as measured by the AES method.

Other suitable insulations are disclosed in WO2009116938 (which is hereby also incorporated by reference). In this case, at least one metal-organic layer is located outside the first phosphorous-based layer. The metal-organic layer is of a metal-organic compound having the general formula:

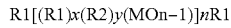

wherein:
M is a central atom selected from Si, Ti, Al, or Zr;
O is oxygen;
R1 is a hydrolysable group;
R2 is an organic moiety and wherein at least one R2 contains at least one amino group;

wherein n is the number of repeatable units being an integer between 1 and 20;
wherein x is an integer between 0 and 1; wherein y is an integer between 1 and 2 (x may thus be 0 or 1 and y may be 1 or 2).

The metal-organic compound may be selected from the following groups: surface modifiers, coupling agents, or cross-linking agents.

R1 in the metal-organic compound may be an alkoxy-group having less than 4, preferably less than 3 carbon atoms.

R2 is an organic moiety, which means that the R2-group contains an organic part or portion. R2 may include 1-6, preferably 1-3 carbon atoms. R2 may further include one or more hetero atoms selected from the group consisting of N, O, S and P. The R2 group may be linear, branched, cyclic, or aromatic. R2 may include one or more of the following functional groups: amine, diamine, amide, imide, epoxy, hydroxyl, ethylene oxide, ureido, urethane, isocyanato, acrylate, glyceryl acrylate, benzyl-amino, vinyl-benzyl-amino. The R2 group may alter between any of the mentioned functional R2-groups and a hydrophobic alkyl group with repeatable units.

The metal-organic compound may be selected from derivates, intermediates or oligomers of silanes, siloxanes and silsesquioxanes or the corresponding titanates, aluminates or zirconates.

According to one embodiment at least one metal-organic compound in one metal-organic layer is a monomer (n=1).

According to another embodiment at least one metal-organic compound in one metal-organic layer is an oligomer (n=2-20).

According to another embodiment the metal-organic layer located outside the first layer is of a monomer of the metal-organic compound and wherein the outermost metal-organic layer is of an oligomer of the metal-organic compound. The chemical functionality of the monomer and the oligomer is necessary not same. The ratio by weight of the layer of the monomer of the metal-organic compound and the layer of the oligomer of the metal-organic compound may be between 1:0 and 1:2, preferably between 2:1-1:2.

If the metal-organic compound is a monomer it may be selected from the group of trialkoxy and dialkoxy silanes, titanates, aluminates, or zirconates. The monomer of the metal-organic compound may thus be selected from 3-aminopropyl-trimethoxysilane, 3-aminopropyl-triethoxysilane, 3-aminopropyl-methyl-diethoxysilane, N-aminoethyl-3-aminopropyl-trimethoxysilane, N-aminoethyl-3-aminopropyl-methyl-dimethoxysilane, 1,7-bis(triethoxysilyl)-4-azaheptan, triamino-functional propyl-trimethoxysilane, 3-ureidopropyl-triethoxysilane, 3-isocyanatopropyl-triethoxysilane, tris(3-trimethoxysilylpropyl)-isocyanurate, 0-(propargyloxy)-N-(triethoxysilylpropyl)-urethane, 1-aminomethyl-triethoxysilane, 1-aminoethyl-methyl-dimethoxysilane, or mixtures thereof.

An oligomer of the metal-organic compound may be selected from alkoxy-terminated alkyl-alkoxy-oligomers of silanes, titantes, aluminates, or zirconates. The oligomer of the metal-organic compound may thus be selected from methoxy, ethoxy or acetoxy-terminated amino-silsesquioxanes, amino-siloxanes, oligomeric 3-aminopropyl-methoxy-silane, 3-aminopropyl/propyl-alkoxy-silanes, N-aminoethyl-3-aminopropyl-alkoxy-silanes, or N-aminoethyl-3-aminopropyl/methyl-alkoxy-silanes or mixtures thereof.

The total amount of metal-organic compound may be 0.05-0.6%, preferably 0.05-0.5%, more preferably 0.1-0.4%, and most preferably 0.2-0.3% by weight of the composition. These kinds of metal-organic compounds may be commercially obtained from companies, such as Evonik Ind., Wacker Chemie AG, Dow Corning, etc.

The metal-organic compound has an alkaline character and may also include coupling properties i.e. a so called coupling agent which will couple to the first inorganic layer of the iron-based powder. The substance should neutralise the excess acids and acidic bi-products from the first layer. If coupling agents from the group of aminoalkyl alkoxy-silanes, -titanates, -aluminates, or -zirconates are used, the substance will hydrolyse and partly polymerise (some of the alkoxy groups will be hydrolysed with the formation of alcohol accordingly). The coupling or cross-linking properties of the metal-organic compounds is also believed to couple to the metallic or semi-metallic particulate compound which may improve the mechanical stability of the compacted composite component.

Metal or Semi-metallic Particulate Compound

The coated soft magnetic iron-based powder may also contain at least one metallic or semi-metallic particulate compound. The metallic or semi-metallic particulate compound should be soft, having Mohs hardness less than 3.5, and constitute fine particles or colloids. The compound may preferably have an average particle size below 5 μm, preferably below 3 μm, and most preferably below 1 μm. The metallic or semi-metallic particulate compound may have a purity of more than 95%, preferably more than 98%, and most preferably more than 99% by weight. The Mohs hardness of the metallic or semi-metallic particulate compound is preferably 3 or less, more preferably 2.5 or less. $SiO_2$, $Al_2O_3$, MgO, and $TiO_2$ are abrasive and have a Mohs hardness well above 3.5 and is not within the scope of the invention. Abrasive compounds, even as nano-sized particles, cause irreversible damages to the electrically insulating coating giving poor ejection and worse magnetic and/or mechanical properties of the heat-treated component.

The metallic or semi-metallic particulate compound may be at least one selected from the group: lead, indium, bismuth, selenium, boron, molybdenum, manganese, tungsten, vanadium, antimony, tin, zinc, cerium.

The metallic or semi-metallic particulate compound may be an oxide, hydroxide, hydrate, carbonate, phosphate, fluorite, sulphide, sulphate, sulphite, oxychloride, or a mixture thereof.

According to a preferred embodiment the metallic or semi-metallic particulate compound is bismuth, or more preferably bismuth (III) oxide. The metallic or semi-metallic particulate compound may be mixed with a second compound selected from alkaline or alkaline earth metals, wherein the compound may be carbonates, preferably carbonates of calcium, strontium, barium, lithium, potassium or sodium.

The metallic or semi-metallic particulate compound or compound mixture may be present in an amount of 0.05-0.5%, preferably 0.1-0.4%, and most preferably 0.16-0.3% by weight of the composition.

The metallic or semi-metallic particulate compound is adhered to at least one metal-organic layer. In one embodiment of the invention the metallic or semi-metallic particulate compound is adhered to the outermost metal-organic layer.

The metal-organic layer may be formed by mixing the powder by stirring with different amounts of first a basic aminoalkyl-alkoxy silane (Dynasylan®Ameo) and thereafter with an oligomer of an aminoalkyl/alkyl-alkoxy silane (Dynasylan®1146), e.g. by using a 1:1 relation, both produced by Evonik Inc. The composition may be further mixed with different amounts of a fine powder of bismuth(III) oxide (>99 wt %; D50 ~0.3 μm).

Compaction and Heat Treatment

Before compaction the coated iron-based composition may be mixed with a suitable organic lubricant such as a wax, an oligomer or a polymer, a fatty acid based derivate or combinations thereof. Examples of suitable lubricants are EBS, i.e. ethylene bisstearamide, Kenolube® available from Höganäs AB, Sweden, metal stearates such as zinc stearate or fatty acids or other derivates thereof. The lubricant may be added in an amount of 0.05-1.5% of the total mixture, preferably between 0.1-1.2% by weight.

Compaction may be performed at a compaction pressure of 400-1200 MPa at ambient or elevated temperature.

After compaction, the compacted components are subjected to heat treatment at a temperature up to 800° C., preferably between 600-750° C. Examples of suitable atmospheres at heat treatment are inert atmosphere such as nitrogen or argon or oxidizing atmospheres such as air.

The hub electric motor unit may comprise bearings for rotatably mounting the hub shell to the hub shaft.

In some embodiments the modulated pole machine comprises a claw pole arrangement or extension. For modulated pole machines, taking as fixed a geometry which forms torque from a circumferential/axial surface i.e. a radial field machine, the field may be carried radially across the air gap with the magnetic circuit, circumferentially by one pole pitch, which can be done in the stator or the rotor or partially in both, and axially in both directions to enclose the coil. If the axial circuit is closed in the stator around the coil, the claw pole arrangement is produced.

The electrical rotary machine may be a multi-phase machine where the stator is a multi-phase stator, where the phases are arranged side-by-side in the axial direction, and where each phase comprises two stator core sections each having a respective set of teeth, a flux bridge connecting the stator core sections, and a coil, and where the teeth are arranged to protrude towards the rotor.

The present invention relates to different aspects including the hub electric motor unit described above and in the following, and corresponding wheels, vehicles, etc., each yielding one or more of the benefits and advantages described in connection with the first mentioned aspect, and each having one or more embodiments corresponding to the embodiments described in connection with the first mentioned aspect and/or disclosed in the appended claims.

In particular, disclosed herein is a wheel for a motor-driven or motor-assisted vehicle, the wheel comprising a hub electric motor unit as disclosed herein.

Embodiments of the wheel further comprise a wheel rim connected to the hub electric motor unit by a plurality of spokes. When the axial distance between the connecting parts of the respective cap members is larger than the axial width of the wheel rim, the force applied by the spokes between the wheel rim and the cap members has a radial and an axial component, such that the axial component pulls the cap members axially towards each other, thereby providing a holding force for holding the motor components in place.

According to another aspect, disclosed herein is a bicycle or other vehicle comprising a wheel having a hub electric motor unit as disclosed herein.

BRIEF DESCRIPTION OF THE DRAWINGS

The above and/or additional objects, features and advantages of the present Invention, will be further elucidated by the following Illustrative and non-limiting detailed description of embodiments of the present invention, with reference to the appended drawings, wherein.

DETAILED DESCRIPTION

In the following description, reference is made to the accompanying figures, which show by way of illustration how the invention may be practiced.

Figure 1:
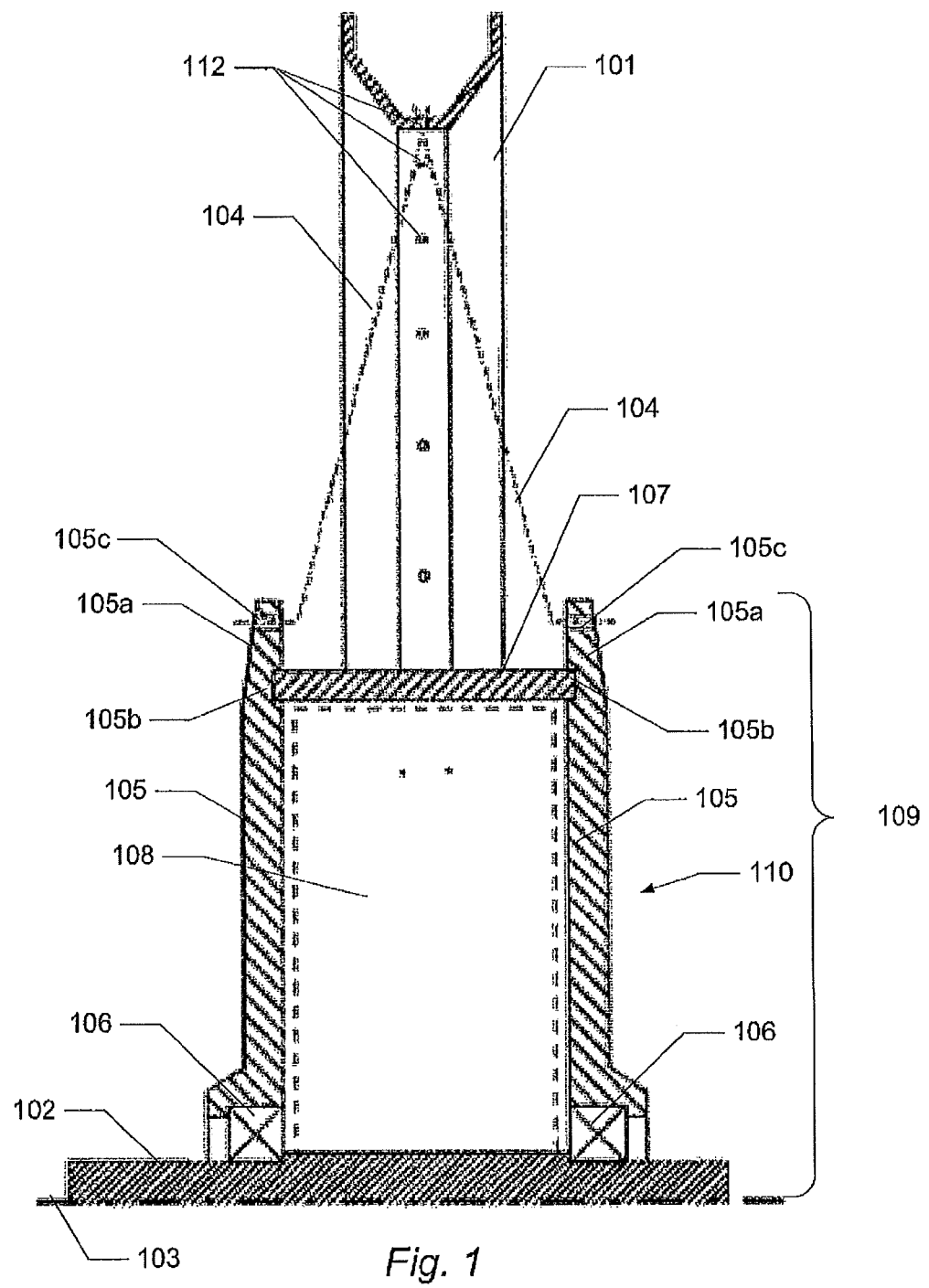
FIG. 1 shows a schematic, cross-sectional view of an example of a bicycle wheel comprising a hub electric motor unit.

FIG. 1 shows a schematic, cross-sectional view of an example of a bicycle wheel comprising a hub electric motor unit. The wheel may be a rear wheel or a front wheel of a bicycle.

The wheel comprises a wheel rim 101, a wheel hub 109 and a plurality of spokes 104 extending between the wheel rim and the hub. The hub rotatably mounts the wheel to the frame of the bicycle.

The hub 109 comprises a hub shaft 102, a hub shell 110, and a stator 108 of a modulated pole machine. The hub shaft 102 defines an axis 103 of rotation of the wheel. The hub shaft is mountable to a frame of the bicycle, e.g. to a front or rear fork. To this end, the hub shaft 102 may have threaded end portions for providing a mounting area for mounting the hub shaft to the open end of a fork (not explicitly shown.)

Figure 5:
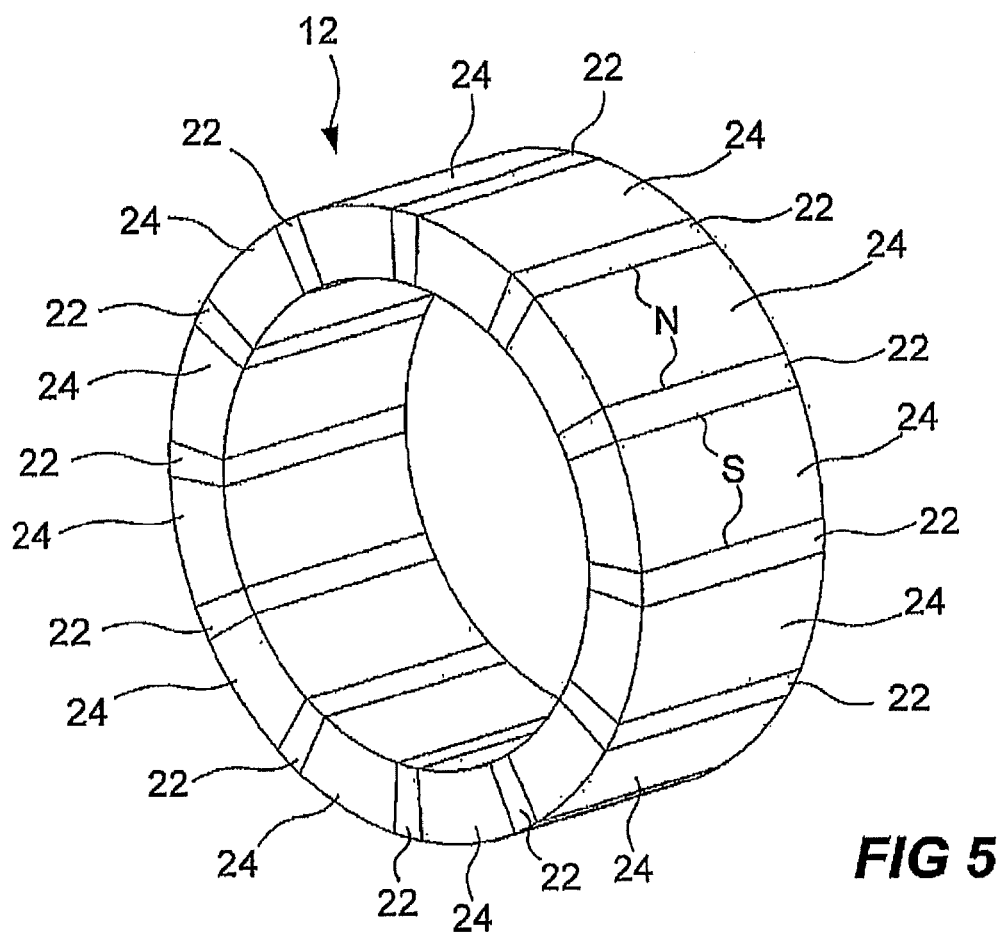
FIG. 5 shows another example of a rotor for use in a hub electric motor.

The hub shell 110 comprises a tubular rotor component 107 and two disc-shaped end-plates 105. The hub shell is rotatably mounted on the hub shaft 102 via bearings 106 arranged between the hub shaft end the end plates. The end-plates are arranged on respective sides of the tubular rotor component 107 and connected to the respected rims 105a of the rotor. The end plates may comprise respective annular recesses into which the rims may be fitted as shown in FIG. 1. Furthermore, the rotor component 107 and/or the end-plates comprise mounting members for non-rotatably connecting the rotor component with the end plates so as to allow the transfer of torque from the rotor to the end-plates. For example, the rotor component may comprise shafts axially extending from its rim into the end-plates. It will be appreciated that the rotor component 107 shown in FIG. 1 may constitute the entire magnetically active rotor structure, e.g. in case of a rotor as shown in FIG. 5. Alternatively, the rotor component 107 may form an outer tubular support structure to which magnetically active components of the rotor are mounted directly, e.g. the tubular support structure 201 of the embodiment of the rotor shown in FIG. 3. The rotor component 107 may thus comprise mounting means, e.g. in the form of axially extending ridges, grooves or the like for mounting the permanent magnets and/or rotor pole sections directly to the rotor component 107.

The rotor comprises the magnetic active rotor components, e.g. axially extending permanent magnets and rotor pole pieces alternatingly arranged so as to form the tubular rotor structure 107. In some embodiments, the magnetic components are mounted to the inner surface of a protective tubular structure, e.g. made of aluminum alloy or other non-magnetic material such as plastic. Examples of a suitable tubular rotor will be described in more detail with reference to FIGS. 2 and 3 below.

The stator 108 is non-rotatably mounted to the hub shaft 102 and extends radially outward towards the rotor 107, so as to define an active air gap for communicating magnetic flux during operation of the motor. An example of a suitable stator will be described in greater detail in FIG. 2.

Each end plate 105 comprises a mounting flange 105a that extends radially outward beyond the outer circumference of the rotor 107. The mounting flange comprises holes 105c or other mounting members for securing the spokes the end plate. Hence, forces transferred from the bike to the rim through the shaft, are transferred directly over the bearings and the end-plates, thereby minimizing any radial forces on the rotor 107. Hence, the rotor drum will not deform radially when the spokes are tensioned, thereby providing an accurate air gap between the rotor and the stator with an air gap width that is constant along the axial extent of the motor. Consequently, any non-magnetic parts of the rotor, e.g. a protective outer tube, can be made of e.g. plastic material that normally cannot be used since it will not stand the forces from spokes. Furthermore, the motor design may be made with tight tolerances, thus increasing the efficiency of the motor.

The end-plates may be made of any suitable material providing a sufficient radial stiffness to avoid radial deformation due to the forces transferred from the spokes. Examples of suitable materials include metal, e.g. Iron-based metal, an aluminum allow, or the like.

As the mounting points 105c of the spokes at the respective end plates have a larger axial distance from the mounting points on the respective other end plate than the corresponding mointing points 112 on the wheel rim, the spokes transfer an axial force to the end plates pulling the end plates towards each other. Hence, the spokes hold the rotor in place by their axial force components.

Specially of importance when the rotor section is mechanically weak as for the MPM spoked rotor design.

It is a further advantage that the hub electric motor unit can not be opened without removing all spokes, thereby increasing the safety of the wheel, as the hub will not separate easily.

It is a further advantage of embodiments disclosed herein, that the manufacturing is simplified, as the end-plates may have a simple geometry, and since the magnetically active rotor components can be integrated in the rotor-hub without considering the demands for mounting the spokes to the same structure.

Figure 2A:
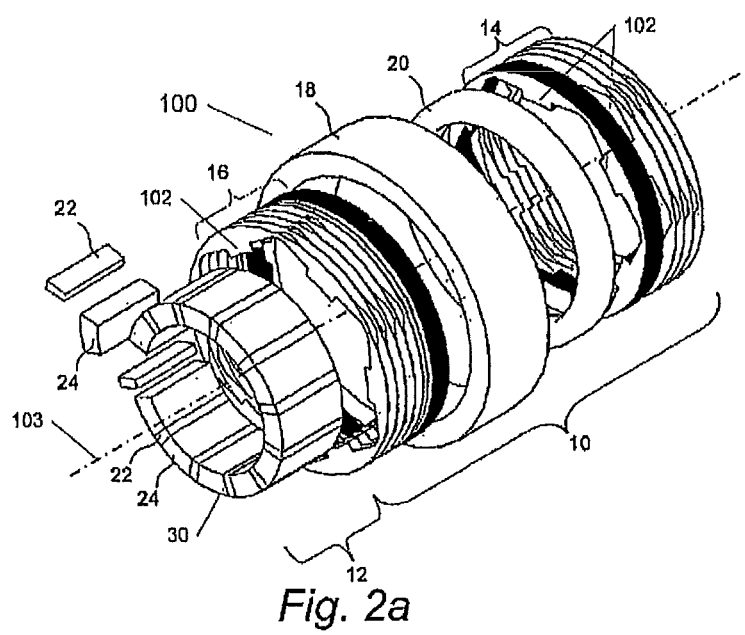
FIG. 2 shows an example of a modulated pole machine.
Figure 2B:
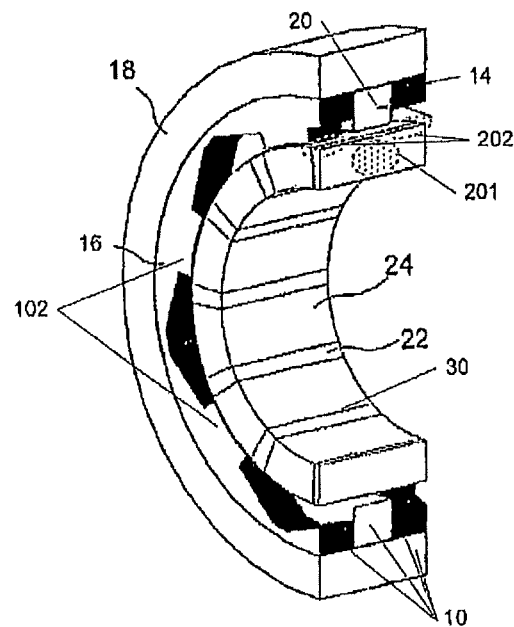

FIG. 2 shows an example of a modulated pole machine. FIG. 2a shows an exploded, perspective view of a modulated pole machine. FIG. 2b shows a cross-sectional view of a prior art modulated pole machine.

The modulated pole electric machine 100 comprises a stator 10 and a rotor 30. The stator 10 comprises a central single winding 20 that magnetically feeds multiple teeth 102 formed by a soft magnetic core structure. The stator core is then formed around the winding 20 while for other common electrical machine structures the winding is formed around the individual tooth core section. More particularly, the shown modulated pole electric machine 100 comprises two stator core sections 14, 16 each including a plurality of teeth 102 and being substantially circular, a coil 20 arranged between the first and second circular stator core sections, and a rotor 30 including a plurality of permanent magnets 22. Further, the stator core sections 14, 16, the coil 20 and the rotor 30 are encircling a common geometric axis 103, and the plurality of teeth of the two stator core sections 14, 16 are arranged to protrude towards the rotor 30 for forming a closed circuit flux path. The machine in FIG. 2 is of the radial type as the stator teeth protrudes in a radial direction towards the rotor. Examples of suitable motor designs are disclosed in WO2007/024184. It will be appreciated, however, that different motor designs may be used in the hub electric motor described herein.

The active rotor structure 30 is built up from an even number of segments 22, 24 whereas half the numbers of segments also called rotor pole sections 24 are made of soft magnetic material and the other half of number of segments of permanent magnet material 22. These segments may be produced as individual components. Often the number of segments can be rather large typically of order 10-50 individual sections. The permanent magnets 22 are arranged so that the magnetization directions of the permanent magnets are substantially circumferential, i.e. the north and the south pole, respectively, is facing in a substantially circumferential direction. Further, every second permanent magnet 22, counted circumferentially is arranged having its magnetization direction in the opposite direction in relation to the other permanent magnets. The magnetic functionality of the soft magnetic pole sections 24 in the desired machine structure is fully three dimensional and it is required that the soft magnetic pole section 24 is able to efficiently carry varying magnetic flux with high magnetic permeability in all three space directions. A traditional design using laminated steel sheets will not show the required high permeability in the direction perpendicular to the plane of the steel sheets and its here beneficial to use a soft magnetic structure and material that shows a higher magnetic flux isotropy than a state of art laminated steel sheet structure.

FIG. 2b shows the same radial modulated pole electric machine as from FIG. 2a but in a cross-sectional view of the assembled machine showing more clearly how the stator teeth 102 extend towards the rotor and how the stator teeth of the two stator core sections 14, 16 are rotationally displaced in relation to each other.

In the example shown in FIG. 2, the motor is of the inner rotor type where the stator surrounds the rotor and the teeth protrude radially inward. However, it will be appreciated that in embodiments of the hub electric motor unit described herein, an outer rotor design may be used where the rotor surrounds the stator and the teeth protrude radially outward.

In the following, examples of a rotor and a stator will be described in greater detail that may be used as a part of the hub electric motor unit shown in FIG. 1. It should be understood that examples of the rotor and stator described in this application may be used together with stators of modulated pole machines of different types than the one described above.

Figure 3:
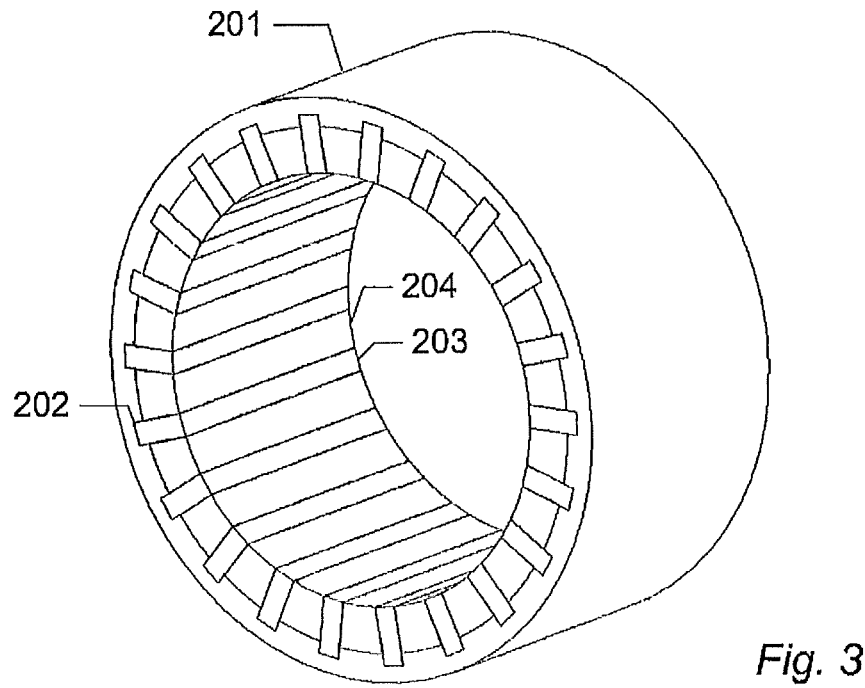
FIG. 3 shows an embodiment of a rotor for a hub electric motor unit.

FIG. 3 shows an outer rotor for use in a hub electric motor unit. The outer rotor comprises a tubular support structure 201, a plurality of permanent magnets 203 and a plurality of rotor pole section 204.

The tubular support structure 201 has a radius and a height, where the height extends along an axial axis of the tubular support structure 201. The tubular support structure 201 comprises a plurality of recesses 202 positioned periodically around the periphery of the support structure 201 in a circumferential mounting surface, being the inner surface of the tubular support structure 201. The tubular support structure 201 may be made of a non-permeable material e.g. a non-magnetic material such as aluminium or plastic. The plurality of recesses 202 extend in an axial direction of the tubular support structure. The recess may comprise two parallel side walls extending in a radial direction into the tubular support structure. The two parallel side walls may be connected by an end wall. The recesses extend through the entire height of the tubular support structure 201.

Each of the plurality of recesses is fitted with a permanent magnet 203. The permanent magnets 203 may be secured in the recesses 202 by a frictional fit and/or any kind of fastening means such as a suitable type of glue.

The rotor pole sections 204 are fitted into the slots formed by the permanent magnets fitted inside the recesses 202 of the support structure 201. The rotor pole sections 204 may be fastened to the permanent magnet and/or support structure by a frictional fit formed by the permanent magnets and/or any type of fastening means e.g. a suitable type of glue. As the permanent magnets 203 are fitted into the recesses 202 of the support structure 201, they extend radially further outwards than the rotor pole sections 204. Thereby a greater portion of the magnetic field generated by the permanent magnets 203 can be utilized by the polar sections to generate the rotor magnetic field. This will decrease the magnetic requirements of the permanent magnets, so that smaller permanent magnets may be used, lowering the production costs.

The support structure 201 may have an axial extent larger than the length of the rotor pole sections and/or the permanent magnets, thus forming rims of the tubular structure axially extending beyond the rotor pole sections and/or permanent magnets. These rims may thus serve as or include mounting means for attaching the end caps of a hub shell to the tubular structure. For example, the rims may be fitted into annular recesses in the respective end caps as shown in FIG. 1.

Figure 4:
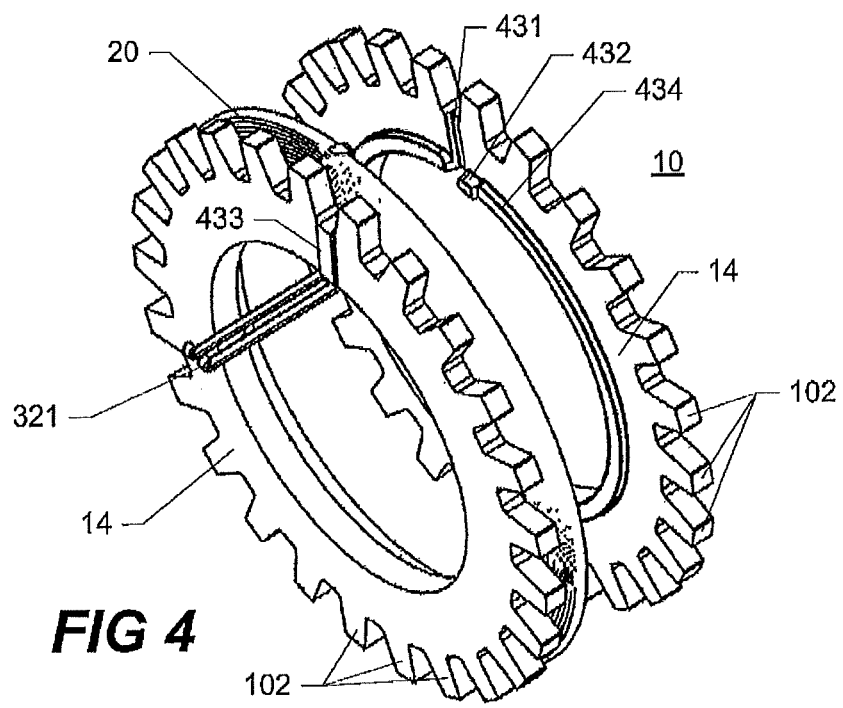
FIG. 4 shows a single phase stator for use in a hub electric motor.

FIG. 4 shows a single phase stator comprising two stator core sections 14 and one coil 20. The single phase stator 10 of FIG. 4 may be used as a stator of a single-phase machine and/or as a stator phase of a multi-phase machine (e.g. the 3-phase machine shown in FIG. 6). The stator comprises two identical stator sections 14, each made of compacted magnetic powder, where each stator section comprises a number of teeth 102. Each stator core section is made of magnetic powder metal and separately compacted to shape in a press tool. When the stator core sections have identical shapes, they may be pressed in the same tool. The two stator core sections are then joined in a second operation, and together form the stator core with radially extending stator core teeth, where the teeth of one stator core section are axially and circumferentially displaced relative to the teeth of the other stator core section.

In FIG. 5 an embodiment of a rotor 12 for use in the embodiment of FIG. 1 is shown. The rotor 12 comprises sections of permanent magnets 22 and pole sections 24 made from soft magnetic material. The pole sections 24 are arranged between the permanent magnets 22, thereby separating the permanent magnets 22 from each other.

In the embodiment shown in FIG. 5 the permanent magnets 22 and the pole sections 24 extend substantially the same distance in the axial direction of the rotor. The permanent magnets are arranged so that the magnetization direction of the permanent magnets are substantially circumferential, i.e. the north and south pole, respectively, is facing in a substantially circumferential direction.

Further, every second permanent magnet 22, counted circumferentially, is arranged having its magnetization direction in the opposite direction in relation to the other permanent magnets. Accordingly, the north pole N of one permanent magnet 22 will face the north pole N of one of the neighboring permanent magnet 22. In the same manner the south pole S of one permanent magnet 22 will face the south pole S of a neighboring permanent magnet 22. This design of the rotor 12 has the advantage of enabling flux concentration, including axial flux concentration, from the permanent magnets 22 so that the surface of the rotor 12 facing a tooth of the stator (e.g. a tooth 102 of the stator of FIG. 4) may present the total magnetic flux from both of the neighboring permanent magnets 22 to the surface of the facing tooth. The flux concentration may be seen as a function of the area of the permanent magnets 22 facing each pole section 24 divided with the area facing a tooth. These flux concentration properties of each pole section 24 makes it possible to use weak low cost permanent magnets as permanent magnets 22 in the rotor and makes it possible to achieve very high air gap flux densities. The flux concentration may be facilitated by the pole section being made from soft magnetic powder enabling effective three dimensional flux paths. Further, the design also makes it possible to make more efficient use of the magnets than in corresponding types of machines. Yet another advantage of the design is that the magnets see substantially the same reluctance independent of the rotor position alleviating problems with pulsating flux.

Figure 6:
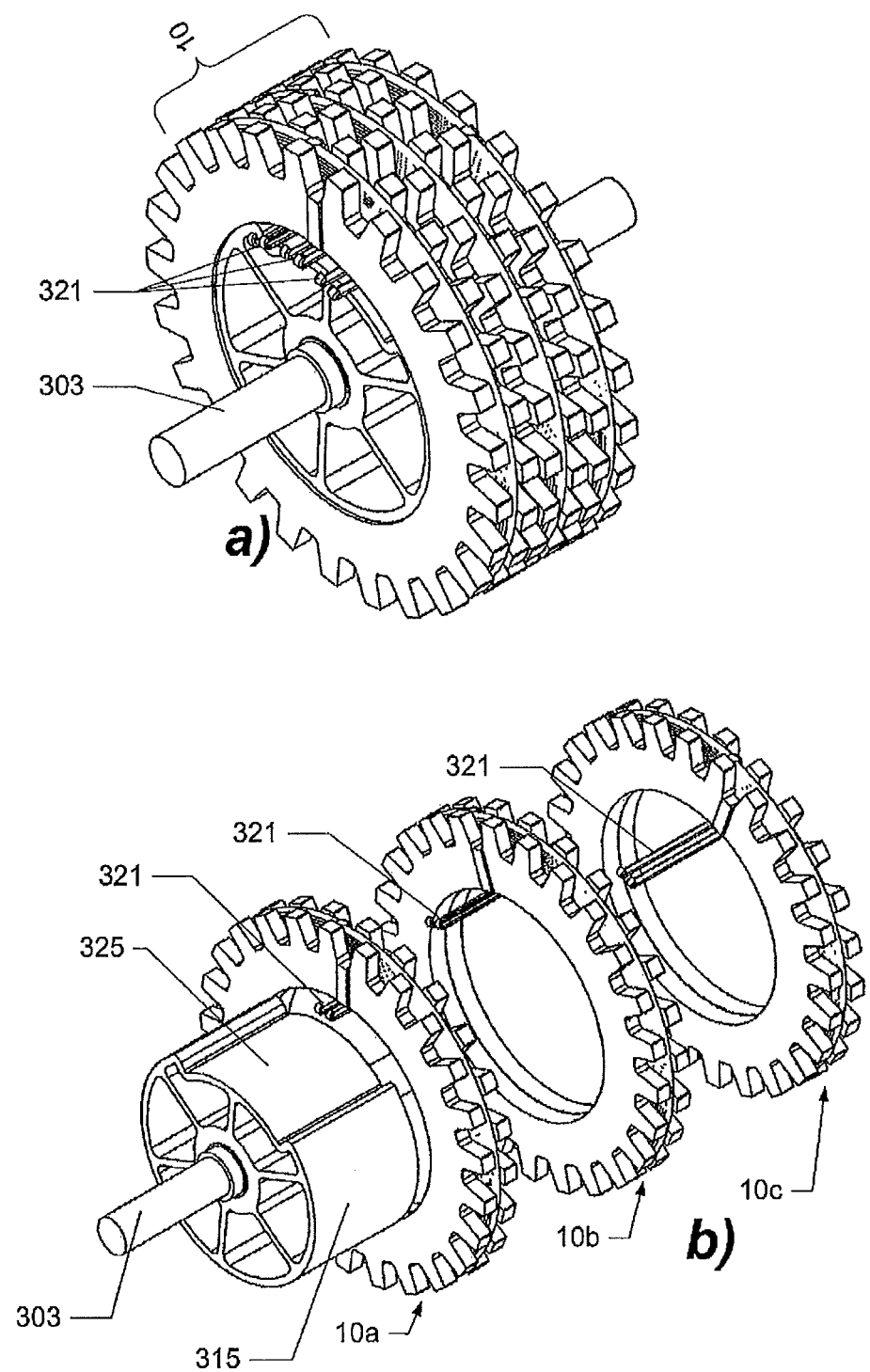
FIG. 6 shows an example of a 3-phase stator for use in a hub electric motor unit.

FIG. 6 shows an example of a 3-phase stator for use in a hub electric motor unit, the 3-phase stator containing three sets of stator component pairs, each holding one circumferential winding. In particular, FIG. 6a shows a perspective view of the stator while FIG. 6b shows an exploded view of the stator. The stator of FIG. 6 comprises three stator phase sections 10a-c, each similar to the stator of FIG. 2, but for an outer rotor configuration, i.e. with teeth 102 protruding radially outward.

As in the example of FIG. 2, each electric modulated pole machine stator 10a-c of FIG. 6 comprises a central coil 20a-c, e.g. a single winding, that magnetically feeds multiple teeth 102 formed by the soft magnetic core structure. More particularly, each stator phase 10a-c of the shown electric modulated pole machine 100 comprises two stator core sections 14, each including a plurality of teeth 102 and being substantially annular, a coil 20 arranged between the first and second circular stator core sections. Further, the stator core sections 14 and the coil 20 of each stator phase encircle a common axis defined by a central shaft 303 (e.g. the hub shaft of a wheel such as hub shaft 102 shown in FIG. 1), and the plurality of teeth 102 of the stator core sections 14 are arranged to protrude radially outward. In the example of FIG. 6 a rotor (not explicitly shown) may be arranged coaxially with the stator and encircling the stator so as to form an air gap between the teeth 102 of the stator and the rotor. The rotor may be provided as alternating permanent magnets and pole pieces as described in connection with FIG. 2 but with a radius large enough for the rotor to encircle to stator. Examples of suitable rotors are shown in FIGS. 3 and 5. It will be appreciated that the stator described herein may also be used in a single phase machine or in a multi-phase machine having a different number of phases than three.

The stator core sections are mounted on a cylindrical sleeve 315 that axially projects through the central openings of the stator core sections. The stator core sections are arranged in pairs, with a coil sandwiched between the stator core sections of a pair forming a stator phase. The stator arrangement be axially be fixated by annular cover plates (not explicitly shown) which may be connected to the central cylindrical sleeve 315, e.g. by means of screws.

The stator phase segments 10a-c may further be axially separated from each other by annular separator plates (not shown).

Embodiments of the invention disclosed herein may be used for a direct wheel drive motor for an electric-bicycle or other electrically driven vehicle, in particular a light-weight vehicle. Such applications may impose demands on high torque, relatively low speed and low cost. These demands may be fulfilled by a motor with a relatively high pole number in a compact geometry using a small volume of permanent magnets and wire coils to fit and to meet cost demands by the enhanced rotor assembly routine.

The invention has mainly been described with reference to a bicycle. However, it will be appreciated that the hub electric motor described herein may also be used for other light-weight motor-driven or motor assisted surface vehicles, such as tricycles.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A hub electric motor unit for a motor-driven or motor-assisted vehicle, the vehicle comprising a frame, a wheel having a hub and a wheel rim connected to the hub by a plurality of spokes;
the hub electric motor unit comprising a hub shaft connectable to the frame of the vehicle, a stator unit mounted on the hub shaft, a rotor disposed around and coaxially with the hub shaft, a hub shell rotatably mounted on the hub shaft,
wherein the hub shell comprises two cap members axially disposed on respective sides of the rotor,
wherein each cap member comprises a connecting part for connecting a respective subset of the spokes and
wherein the rotor comprises a plurality of magnetically active components including a plurality of permanent magnets, separated from each other by pole sections made from soft magnetic material, the magnetically active components together forming one or more uninterrupted magnetic flux paths of the rotor, and a tubular support structure defining a circumferential mounting surface for mounting the magnetically active components to the tubular support structure, wherein the hub shell comprises the tubular support structure and the cap members.

2. A hub electric motor unit according to claim 1, wherein the cap members are arranged to transfer radial mechanical forces between the wheel rim and the hub shaft.

3. A hub electric motor unit according to claim 1, wherein the rotor and the stator unit form a modulated pole machine.

4. A hub electric motor unit according to claim 1, wherein stator unit comprises a first stator core section having a substantially annular part and including a plurality of teeth, a second stator core section having a substantially annular part and including a plurality of teeth, and a coil arranged between the first and second annular stator core sections,
wherein the first stator core section, the second stator core section, and the coil are disposed around and coaxial with the hub shaft,
wherein the plurality of teeth of the first stator core section and the second stator core section are arranged to protrude radially towards the rotor, and
wherein the teeth of the second stator core section may be circumferentially displaced in relation to the teeth of the first stator core section.

5. A hub electric motor unit according to claim 1, wherein the rotor comprises:
the tubular support structure comprising mounting elements for mounting one or more magnetically active components of the rotor to the tubular support structure;

a plurality of permanent magnets magnetized in the circumferential direction of said rotor so as to generate the rotor magnetic field, the permanent magnets being separated from each other in the circumferential direction of the rotor by axially extending rotor pole sections for directing the rotor magnetic field generated by said permanent magnets in at least a radial direction;

wherein at least one permanent magnet or at least one rotor pole section is mounted to said tubular support structure by at least one of said mounting elements.

6. A hub electric motor unit according to claim 5, wherein the mounting elements comprise a plurality of elongated recesses in the mounting surface, the elongated recesses extending in an axial direction of the tubular support structure, and wherein at least one permanent magnet or at least one rotor pole section extends radially at least partly into one of the plurality of recesses.

7. A hub electric motor unit according to claim 1, wherein each cap member may be formed as a single, integral component.

8. A hub electric motor unit according to claim 1, wherein each cap member comprises a disc portion and a plurality of mounting elements, circumferentially disposed around a center of the disc, for mounting respective ones of the spokes.

9. A hub electric motor unit according to claim 1, wherein each cap member has a form of a generally disc-shaped endplate.

10. A hub electric motor unit according to claim 1, wherein each cap member and/or the rotor comprises one or more mounting members for non-rotatably mounting the rotor to the cap member, so as to allow transfer of torque from the rotor to the cap members.

11. A wheel for a motor-driven or motor-assisted vehicle, the wheel comprising a hub electric motor unit as defined in claim 1.

12. A wheel according to claim 11, comprising a wheel rim connected to the hub electric motor unit by a plurality of spokes, wherein the axial distance between the connecting parts of the respective cap members is larger than the axial width of the wheel rim.

13. A vehicle comprising a wheel as defined in claim 11.

* * * * *